United States Patent
Bumueller

(10) Patent No.: US 10,112,657 B2
(45) Date of Patent: Oct. 30, 2018

(54) SUSPENSION SYSTEM FOR A CABIN OF A MINING VEHICLE

(71) Applicant: DUX MACHINERY CORPORATION, Repentigny (CA)

(72) Inventor: Hermann Karl Bumueller, Rosemere (CA)

(73) Assignee: DUX MACHINERY CORPORATION, Repentigny, Quebec (CA)

( * ) Notice: Subject to any disclaimer, the term of this patent is extended or adjusted under 35 U.S.C. 154(b) by 0 days.

(21) Appl. No.: 15/428,196

(22) Filed: Feb. 9, 2017

(65) Prior Publication Data
US 2017/0225721 A1   Aug. 10, 2017

Related U.S. Application Data

(60) Provisional application No. 62/292,900, filed on Feb. 9, 2016.

(51) Int. Cl.
*B62D 33/06* (2006.01)
*E21F 13/02* (2006.01)

(52) U.S. Cl.
CPC ........ *B62D 33/0604* (2013.01); *E21F 13/025* (2013.01)

(58) Field of Classification Search
CPC .. B62D 33/0604; B60G 99/002; F21F 13/025
See application file for complete search history.

(56) References Cited

U.S. PATENT DOCUMENTS

| | | | | |
|---|---|---|---|---|
| 5,044,455 A | * | 9/1991 | Tecco ................ | B60G 99/002 180/89.13 |
| 5,398,774 A | * | 3/1995 | Nilsson ............. | B62D 33/0604 180/89.14 |
| 5,498,060 A | * | 3/1996 | Satomi .............. | B60G 99/002 296/190.07 |
| 8,182,024 B2 | * | 5/2012 | Hayes ............... | B62D 33/067 180/89.13 |
| 9,193,396 B2 | * | 11/2015 | Davisdon .......... | B62D 33/067 |

(Continued)

FOREIGN PATENT DOCUMENTS

DE    4038772 A1 *  6/1992  ......... B62D 33/0604

OTHER PUBLICATIONS

"Haul Truck Suspensions—Better Productivity is Riding on TecsPak" by Miner Elastomer Products Corporation.

*Primary Examiner* — Drew J Brown
(74) *Attorney, Agent, or Firm* — Norton Rose Fulbright Canada LLP

(57) ABSTRACT

A suspension system for a cabin of a mining vehicle. The suspension system comprises a plurality suspension units to support the cabin with respect to the mining vehicle. At least two of the suspension units are pivot suspension units, and each pivot suspension unit is pivotably mountable to the cabin and is fixedly mountable to the mining vehicle. The cabin is pivotable relative to the mining vehicle about a common pivot axis defined by the pivot suspension units. Each pivot suspension unit has an attenuation member to attenuate a pivot movement of the cabin relative to the mining vehicle. An underground mining vehicle and a cabin for a mining vehicle are also disclosed.

20 Claims, 6 Drawing Sheets

(56) References Cited

U.S. PATENT DOCUMENTS

2011/0266727 A1* 11/2011 Knevels ............ B62D 33/0608
267/64.24
2017/0247064 A1* 8/2017 Scott ................. B62D 33/0604
2018/0094404 A1* 4/2018 Paolini .................... E02F 9/166

* cited by examiner

FIG. 4B   FIG. 4C

SUSPENSION SYSTEM FOR A CABIN OF A MINING VEHICLE

CROSS-REFERENCE TO RELATED APPLICATIONS

This application claims priority to U.S. provisional patent application having application No. 62/292,900 and filed Feb. 9, 2016, the entire contents of which are incorporated by reference herein.

TECHNICAL FIELD

The application relates generally to underground mining vehicles and, more particularly, to suspension systems for cabins of mining vehicles.

BACKGROUND

One of the design constraints for underground mining vehicles is to maintain a low profile so that the vehicle can travel through tunnels, shafts, apertures, and other openings in the mine where there is low vertical clearance.

The operator of the vehicle sits in a cabin, or "cab", of the vehicle. The cab contributes to the overall profile of the vehicle, and there have thus been efforts to position the cab so as to minimise its profile. Some conventional attempts to lower the profile of the cab have caused it, and thus the operator stationed within, to experience unacceptably large loads and/or repetitive vibrations.

SUMMARY

In one aspect, there is provided a cabin for a mining vehicle, comprising: a cabin body having a plurality of interconnected walls and a floor attached to the walls, the walls and the floor defining an interior volume of the cabin body to receive within the interior volume an operator of the mining vehicle; and a cabin suspension system having a plurality suspension units to support the cabin body with respect to the mining vehicle, at least two of the suspension units being pivot suspension units, each pivot suspension unit being pivotably mountable to the cabin body and being fixedly mountable to the mining vehicle, the cabin body being pivotable relative to the mining vehicle about a common pivot axis defined by the pivot suspension units, each pivot suspension unit having an attenuation member to attenuate a pivot movement of the cabin body relative to the mining vehicle.

In another aspect, there is provided an underground mining vehicle, comprising: a vehicle body having front wheels and rear wheels; a cabin mounted to the vehicle body in front of the front wheels or in back of the rear wheels, the cabin having a cabin body having a plurality of interconnected walls and a floor attached to the walls, the walls and the floor defining an interior volume of the cabin body to receive within the interior volume an operator of the mining vehicle; and a cabin suspension system having a plurality suspension units to support the cabin body with respect to the vehicle body, at least two of the suspension units being pivot suspension units, each pivot suspension unit being pivotably mounted to the cabin body and being fixedly mounted to the vehicle body, the cabin body being pivotable relative to the vehicle body about a common pivot axis defined by the pivot suspension units, each pivot suspension unit having an attenuation member to attenuate a pivot movement of the cabin body relative to the vehicle body.

In a further aspect, there is provided a suspension system for a cabin of a mining vehicle, comprising: a plurality suspension units to support the cabin with respect to the mining vehicle, at least two of the suspension units being pivot suspension units, each pivot suspension unit being pivotably mountable to the cabin and being fixedly mountable to the mining vehicle, the cabin being pivotable relative to the mining vehicle about a common pivot axis defined by the pivot suspension units, each pivot suspension unit having an attenuation member to attenuate a pivot movement of the cabin relative to the mining vehicle.

DESCRIPTION OF THE DRAWINGS

Reference is now made to the accompanying figures in which:

FIG. 4B is a side view of the pivot suspension unit of FIG. 4A;

FIG. 4C is a front view of the pivot suspension unit of FIG. 4A;

DETAILED DESCRIPTION

Figure 1:
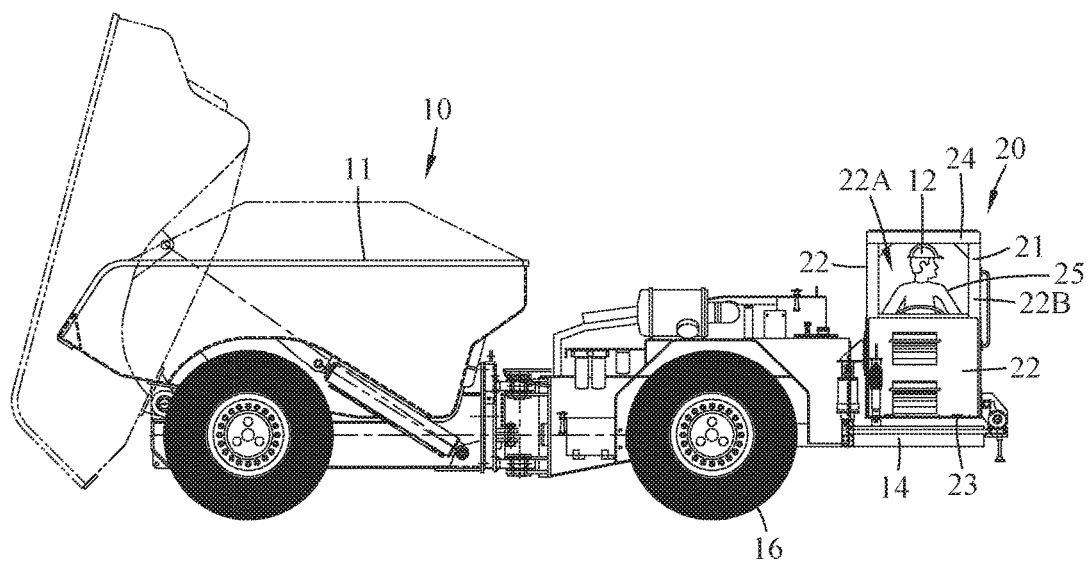
FIG. 1 is a side elevational view of a mining vehicle having a cabin and a cabin suspension system, according to an embodiment of the present disclosure.

FIG. 1 illustrates an underground mining vehicle 10 of the type typically used in tunnels, shafts, and other openings in the mine. The mining vehicle 10 (or simply "vehicle 10") has a "low profile", or relatively small height, which enables it to travel in underground mine shafts which have small vertical clearances. The vehicle 10 shown is an underground dump truck and has a displaceable box 11 for collecting and releasing materials. It will be appreciated that other types of mining vehicles 10 are within the scope of the present disclosure, such as haulers, water trucks, scalers, and scissor lift trucks, for example.

The vehicle 10 has a cabin 20, or "cab", in which an operator 12 of the vehicle 10 can be positioned and/or seated. The cabin 20 is mounted directly or indirectly to the chassis of the vehicle 10. In the embodiment shown, the cabin 20 is mounted to, and supported by, a support platform 14 of the vehicle 10. The support platform 14 is a supporting body which is attached to the body of the vehicle 10, the body being supported by the chassis. The support platform 14 extends from either the rear portion of the body of the vehicle 10. In other embodiments of the vehicle 10, the support platform 14 extends from the front portion of the body of the vehicle 10. In yet other embodiments, the cabin 20 is mounted along one of the sides of the vehicle 10.

The cabin 20 has a cabin body 21 which forms the corpus of the cabin 20 and provides structure thereto. The cabin body 21 has a plurality of interconnected walls 22 which define the enclosure in which the operator 12 is positioned.

The walls 22 have one or more openings 22A therein, so as to allow the operator 12 to view her surroundings. The walls 22 also have one or more support posts 22B. Other configurations for the walls 22 are within the scope of the present disclosure. The cabin body 21 also has a floor 23 or mounting plate which is attached to, and supports, the walls 22. The floor 23 forms the bottommost surface of the cabin 20. The cabin body 21 also has a roof 24 or canopy which is supported by the walls 22 and support posts 22B, and which shields the operator 12 within the cabin 20 from overhead debris. The roof 24 may be required for some vehicles 10, in some jurisdictions, in order to meet the standards for Falling-Object Protective Structures (FOPS) and for Roll-Over Protective Structures (ROPS). The walls 22 and floor 23 define an interior volume 25 of the cabin body 21 that is sized and shaped to receive, within the interior volume 25, the operator 12.

For low profile underground mining vehicles 10, such as the one shown in FIG. 1, it is desirable to minimise the height of the vehicle 10. In the embodiment shown, this reduction in height is at least partly achieved by placing the cabin 20 in back of the vehicle 20. More particularly, the cabin 20 is positioned behind the vehicle 10 and its rear wheels 16 and supported by the support platform 14, thereby allowing the cabin 20 to be lowered closer to the ground to reduce the overall profile of the vehicle 10. Other positions of the cabin 20 are also within the scope of the present disclosure provided that they contribute to reducing the vertical profile of the vehicle 10.

It is known that the vehicle 10 can generate loads and vibrations when it travels, or when it is being used, which are felt by the operator 12. For example, it is known that the vehicle 10 generates loads and/or vibrations when travelling over solid surfaces like hard rock. These loads and/or vibrations are transmitted to the operator 12 positioned in the cabin 20. Some of these loads and/or vibrations are absorbed/dissipated by the wheels 16 and/or other components of the vehicle 10. However, in some instances, these mechanisms alone are not enough to reduce the loads and vibrations experienced by the operator 12, which may still be too high for health and safety requirements.

Positioning the cabin 20 in back of the rear wheels 16 helps to lower the profile of the vehicle 10. However, this positioning of the cabin 20 also distances the cabin 20 further from the center of gravity of the vehicle 10. The cabin 20 is thus more likely to experience the above-described loads and/or vibrations, where the loads are measured in g-forces, and where the vibrations are measured in cycles per minute (CPM). The operator 12 of the vehicle 10, being positioned within the cabin 20, will also experience these loads and/or vibrations. In some jurisdictions, there is a desire and/or requirement to reduce the loads and/or vibrations experienced by the operator 12. The cabin 20 is therefore provided with a cabin suspension system 40, which is now described in greater detail.

Figures 2A, 2B, 2C:
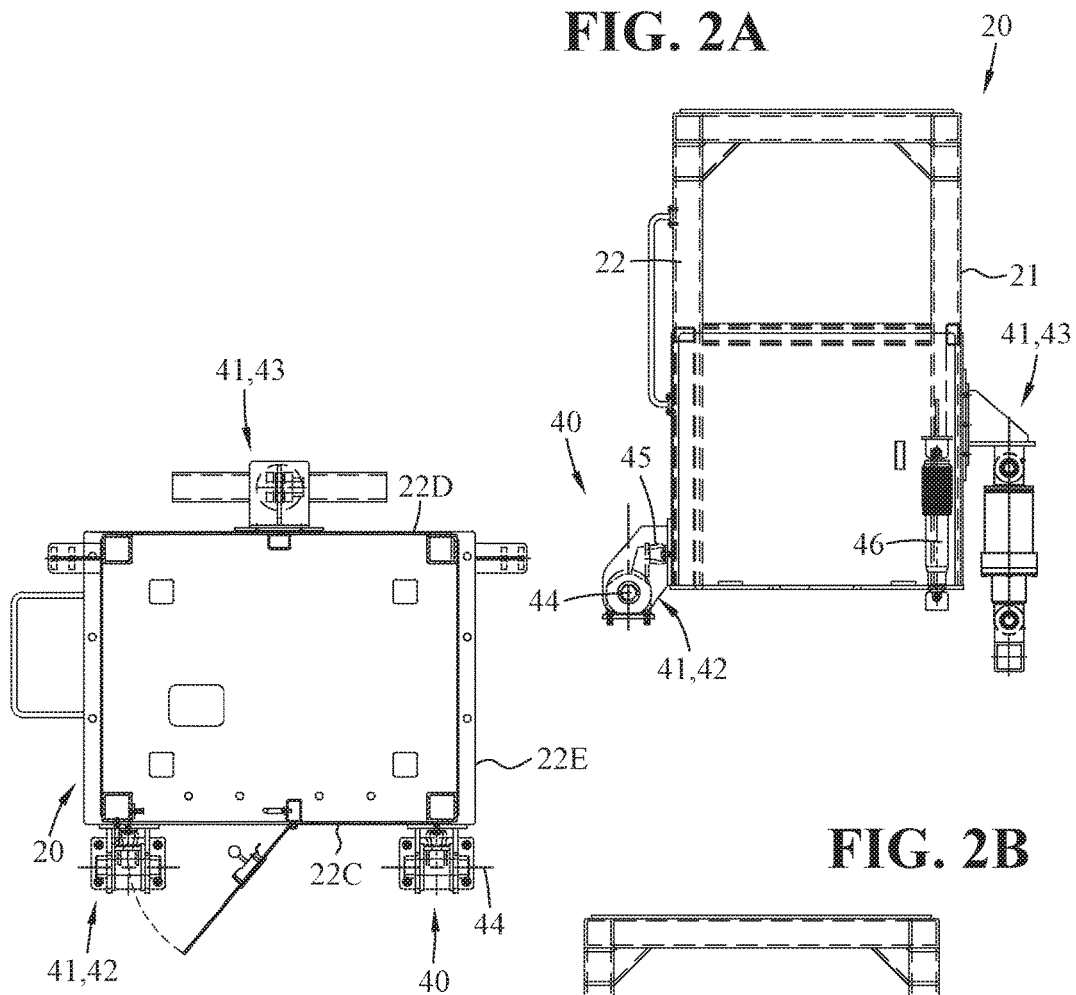
FIG. 2A is a side view of the cabin of FIG. 1.
FIG. 2B is a front view of the cabin of FIG. 1.
FIG. 2C is a top view of the cabin of FIG. 1.

Referring to FIGS. 2A to 2C, the cabin suspension system 40 supports the cabin 20 relative to the vehicle 10. More particularly, the cabin suspension system 40 (or simply "suspension system 40") supports the weight of the cabin body 21 and operator 12 therein, and links the cabin body 21 to the vehicle 10. It will thus be appreciated that the cabin 20 is suspended from the vehicle 10, and thus "floats" relative thereto. In the depicted embodiment, the cabin 20 is supported above the support platform 14 and floats relative thereto. The cabin 20 is therefore connected to the support platform 14 only via the suspension system 40. This floating configuration helps to isolate the cabin 20 and/or the operator 12 therein from the vibratory loads generated during operation of the vehicle 10. Therefore, the loads and/or vibrations caused by the operation of the vehicle 10 are conveyed only through the suspension system 40 before they affect the cabin 20 and/or the operator 12. As will be explained in greater detail below, the suspension system 40 therefore helps to attenuate these loads and/or vibrations before they are felt by the operator 12.

As will be explained in greater detail below, the "floating" cabin 20 is allowed to pivot with respect to the vehicle 10 in response to vibratory loads generated during vehicle operation. This pivoting movement allows the inertia of the cabin 20 and/or the operator 12 therein to contribute to attenuating at least some of the loads and/or accelerations resulting from the displacement or use of the vehicle 10. The additional attenuating components of the suspension system 40 described below contribute further to attenuating the loads and/or accelerations.

The suspension system 40 has a plurality of suspension units 41 which are mounted, directly or indirectly, to the vehicle 10 and which support the cabin body 21. In the embodiment shown, the suspension units 41 include one or more pivot suspension units 42, and one or more displacement suspension units 43, both of which are now described in greater detail.

The pivot suspension units 42 are each pivotably mounted to the cabin body 21, as well as being mounted to the vehicle 10 (or in this embodiment, to the support platform 14). More particularly, a portion/component of each pivot suspension unit 42 is mounted to the cabin body 21 or a wall 22 thereof, while a separate portion/component is mounted to the support platform 14. Each pivot suspension unit 42 defines a pivot axis 44 about which the cabin body 21 can pivot, and the pivot axes 44 of the pivot suspension units 42 are common, or aligned. Each pivot suspension unit 42 has one or more attenuation members 45 which attenuate, or reduce in force, intensity, effect, etc. a pivoting movement of the cabin body 21 about the common pivot axes 44.

It will thus be appreciated that the cabin body 21 is pivotable about the common pivot axes 44 in response to loads generated by the operation and/or displacement of the vehicle 10. This pivoting movement of the cabin body 21 (and of the operator within) is reduced at least by the pivot suspension units 42.

The displacement suspension unit 43 helps to attenuate a vertical displacement of the cabin body 21 as it pivots about the common pivot axes 44. As such, and at least in the depicted embodiment, the displacement suspension unit 43 is mounted to the cabin body 21 on an opposite side than where the pivot suspension units 42 are mounted to the cabin body 21, and on an opposite side of the common pivot axes 44. The displacement suspension unit 43 is mounted to the cabin body 21, and is also mounted, directly or indirectly, to the vehicle 10.

Both the pivot and displacement suspension units 42,43 support the cabin body 21. More particularly, in the depicted embodiment, the pivot and displacement suspension units 42,43 support the cabin body 21 above the support platform 14 of the vehicle 10. The cabin body 21 in such a configuration therefore "floats" above the support platform 14, and defines a vertical space or distance between the floor 23 of the cabin body 21 and the support platform.

Both the pivot and displacement suspension units 42,43 help to attenuate the g-forces transmitted from the vehicle 10 to the cabin body 21. These g-forces may result from the suspended cabin body 21 experiencing up or down displacement, such as when the vehicle travels respectively over a bump or depression. The pivot and displacement suspension units 42,43 help to absorb these loads before they affect the cabin body 21, and thereby help to reduce the up or down displacement experienced by the operator 12.

Still referring to FIGS. 2A to 2C, the suspension system 40 also includes dampening elements. These dampening elements help to reduce the vibrations experienced by the cabin body 21, and thus by the operator 12 within. The vibrations, which may be measured in cycles per minute (CPM), are caused by forces which are smaller in magnitude than the g-forces mentioned above, but which occur at relatively high frequencies such that they can cause operator fatigue or discomfort over prolonged exposure periods.

The depicted embodiment shows one possible dampening element for the suspension system 40. The suspension system 40 includes one or more shock absorbing members 46. A first end of each shock absorbing member 46 is mounted to the support platform 14, and an opposed second end of the shock absorbing member 46 is mounted to a wall 22 of the cabin body 21. In operation, the shock absorbing member 46 helps to attenuate the vibrations (e.g. lowers the CPM) experienced by the cabin body 21 when the vehicle 10 is used.

The positioning of the pivot and displacement suspension units 42,43, and of the dampening elements, with respect to one another can be varied. For example, and as shown in the depicted embodiment, each pivot suspension unit 42 is pivotably mounted to a first wall 22C of the cabin body 21. The displacement suspension unit 43 is mounted to a second wall 22D of the cabin body 21. The first wall 22C is a different wall 22 from the second wall 22D. The pivot suspension units 42 are therefore mounted to a different wall 22 of the cabin body 21 than the displacement suspension unit 43. In the depicted embodiment, the displacement suspension unit 43 is mounted to the second wall 22D that is opposite to the first wall 22C of the pivot suspension units 42. The displacement suspension unit 43 is therefore disposed on an opposite side of the cabin body 21 from the common pivot axis 44. Similarly, the shock absorbing member 46 is mounted to a third wall 22E of the cabin body 21. The third wall 22E is a different wall 22 from both the first and second walls 22C,22D of the cabin body 21. In the depicted embodiment, the shock absorbing member 46 is mounted to a wall 22E that is between the pivot and displacement suspension units 42,43.

Figure 3B:
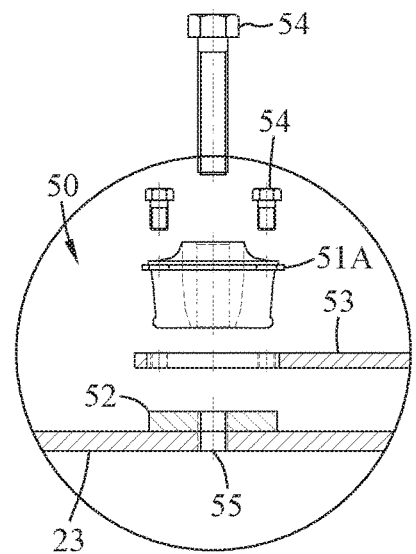
FIG. 3B is an enlarged and exploded view of the circled portion in FIG. 3A.
Figure 3A:
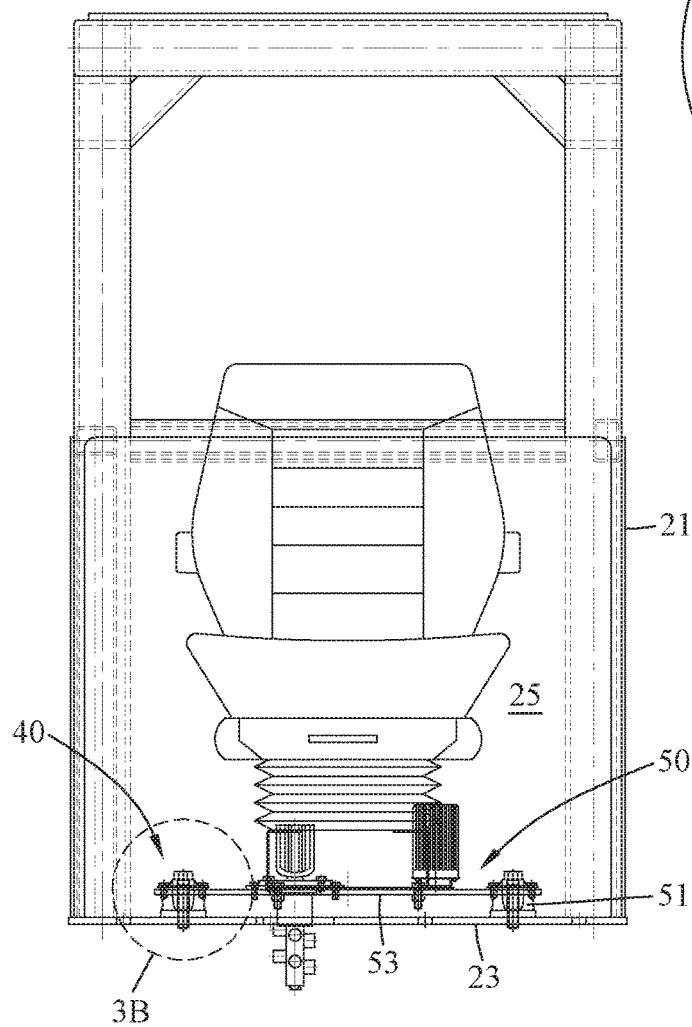
FIG. 3A is a front view of a floating floor assembly of the cabin suspension system of FIG. 1.

FIGS. 3A and 3B show another possible dampening element of the suspension system 40. The suspension system 40 in the depicted embodiment includes a floating floor assembly 50. The floating floor assembly 50 is located within the interior volume 25 of the cabin body 21. The floating floor assembly 50 has a plurality of dampening members 51 which are mounted to the floor 23 of the cabin body 21. The floating floor assembly 50 also has a floor plate 53 which is supported by the dampening members 51 above the floor 23 of the cabin body 21. The floor plate 53 is thus suspended, or "floats", relative to the floor 23. When the vehicle 10 is being used, the dampening members 51 help to attenuate the vibrations transmitted to the floor plate 53 from the floor 23 of the cabin body 21.

Referring to FIG. 3B, the floating floor assembly 50 includes a spacer 52 used to position the floor plate 53 at the correct height from the floor 23. One or more of the dampening members 51 includes a rubber or polymeric mount 51A which is positioned at least partially between the floor plate 53 and the floor 23 and/or spacer 52 to attenuate the vibrations transmitted to the floor plate 53. One or more fasteners 54 can be inserted into holes 55 in the floor plate 53 and the floor 23 to secure the rubber mount 51A in position.

Figure 4A:
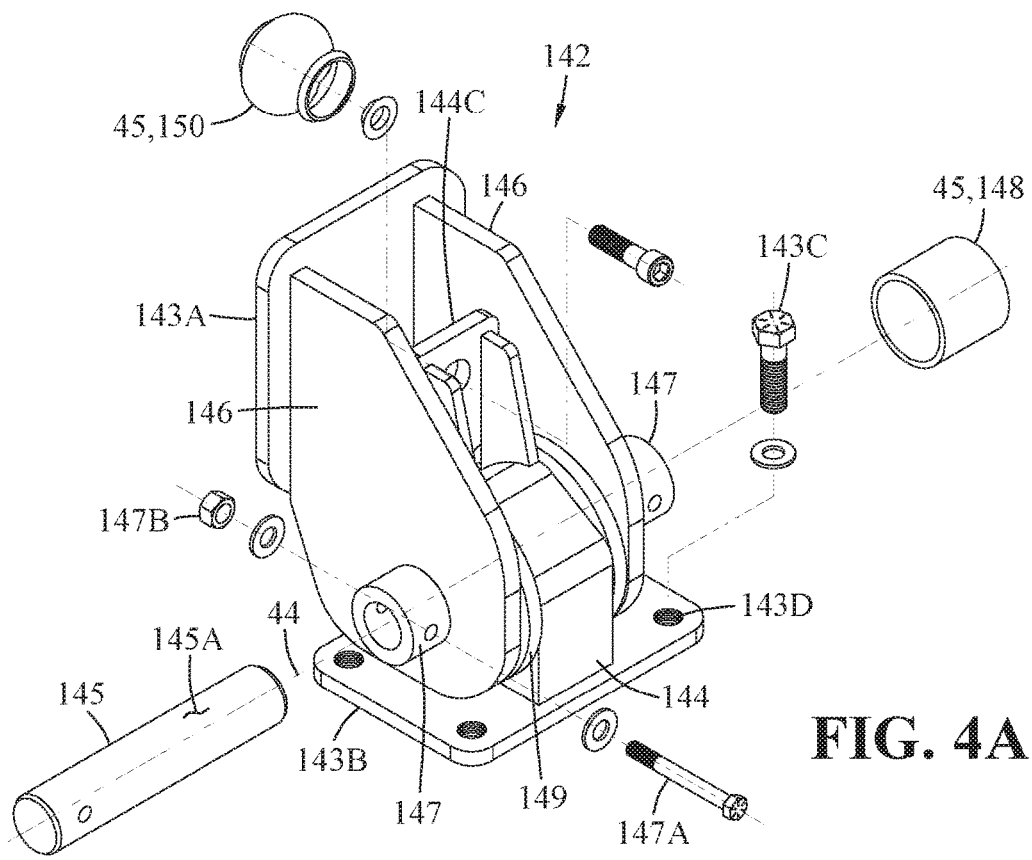
FIG. 4A is an exploded perspective view of a pivot suspension unit of the cabin suspension system of FIG. 1.
Figure 4A:
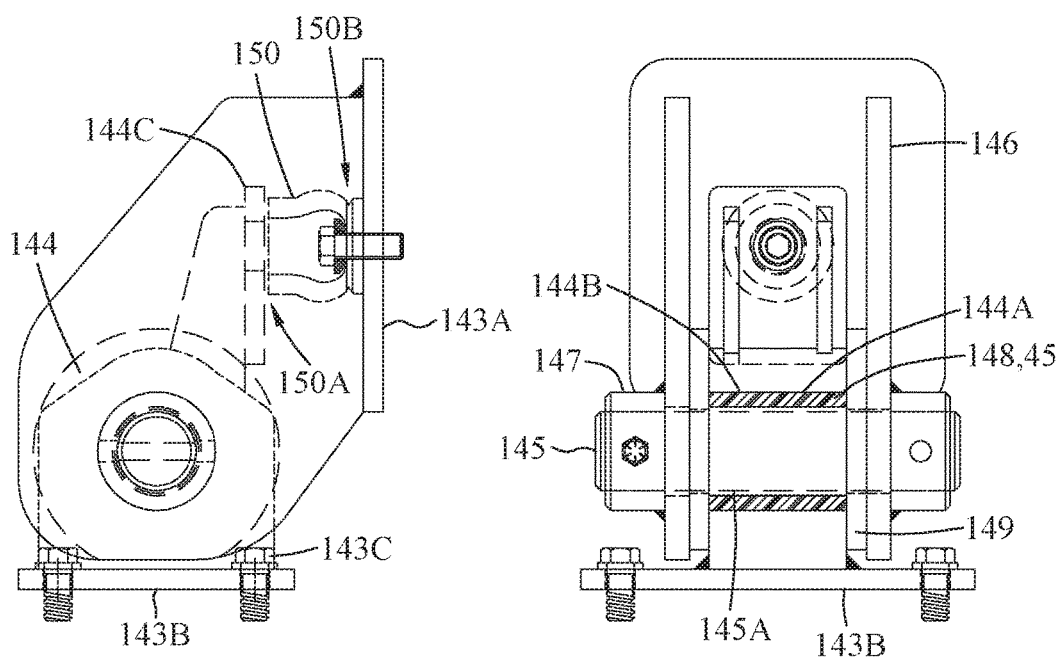

FIGS. 4A to 4C show a possible configuration of a pivot suspension unit 142. Each pivot suspension unit 142 has a first mounting plate 143A mounted to the wall 22 of the cabin body 21, and a second mounting plate 143B secured to the support platform 14 via bolts 143C inserted through holes 143D in the second mounting plate 143B. A mounting bracket 144 is attached to the second mounting plate 143B, and has a through slot 144A to receive a pivot pin 145 therein. The pivot pin 145 is rotatable within the slot 144A relative to the mounting bracket 144 about the pivot axis 44. One or more bracket plates 146 are attached to the first mounting plate 143A. Each bracket plate 146 has a collar 147 for attaching to the pivot pin 145. The pivot pin 145 is secured at its ends with a bolt 147A and nut 147B to each collar 147 to prevent relative rotation between the bracket plates 146 and the pivot pin 145. The bracket plates 146 and the pivot pin 145 therefore rotate together about the pivot axis 44. The bracket plates 146 are also fixedly attached to the first mounting plate 143A. Therefore, forces transmitted to the bracket plates 146 by the first mounting plate 143A when the vehicle 10 is being used are transmitted to the pivot pin 145, such that both the bracket plates 146 and the pivot pin 145 are thereby caused to rotate about the pivot axis 44.

The pivot suspension unit 142 of the depicted embodiment has two attenuation members 45. A first attenuation member 45 is a polyurethane bushing 148 positioned between an outer surface 145A of the pivot pin 145 and an inner surface 144B of the through slot 144A of the mounting bracket 144. The bushing 148 is tightly fitted between the pivot pin 145 and the slot 144 such that it frictionally engages both the outer surface 145A of the pivot pin 145 and the inner surface 144B of the slot 144A. This frictional engagement helps the bushing 148 to attenuate the pivoting movement of the pivot pin 145 caused by the pivoting of the bracket plates 146. Non-metallic (e.g. Teflon™) spacer plates 149 or rings can be used between the bracket plates 146 and the mounting bracket 144 to prevent metal-on-metal contact, and to allow the bracket plates 146 to pivot relative to the mounting bracket 144. A second attenuation member 45 includes a force-attenuating bumper 150 is positioned between the first mounting plate 143A and the mounting bracket 144 to attenuate the forces transmitted by the first mounting plate 143A. In the depicted embodiment, the mounting bracket 144 has an upper plate 144C. A first end 150A of the bumper 150 is attached to the upper plate 144C and a second end 150B of the bumper 150 is attached to the first mounting plate 143A.

Figure 5:
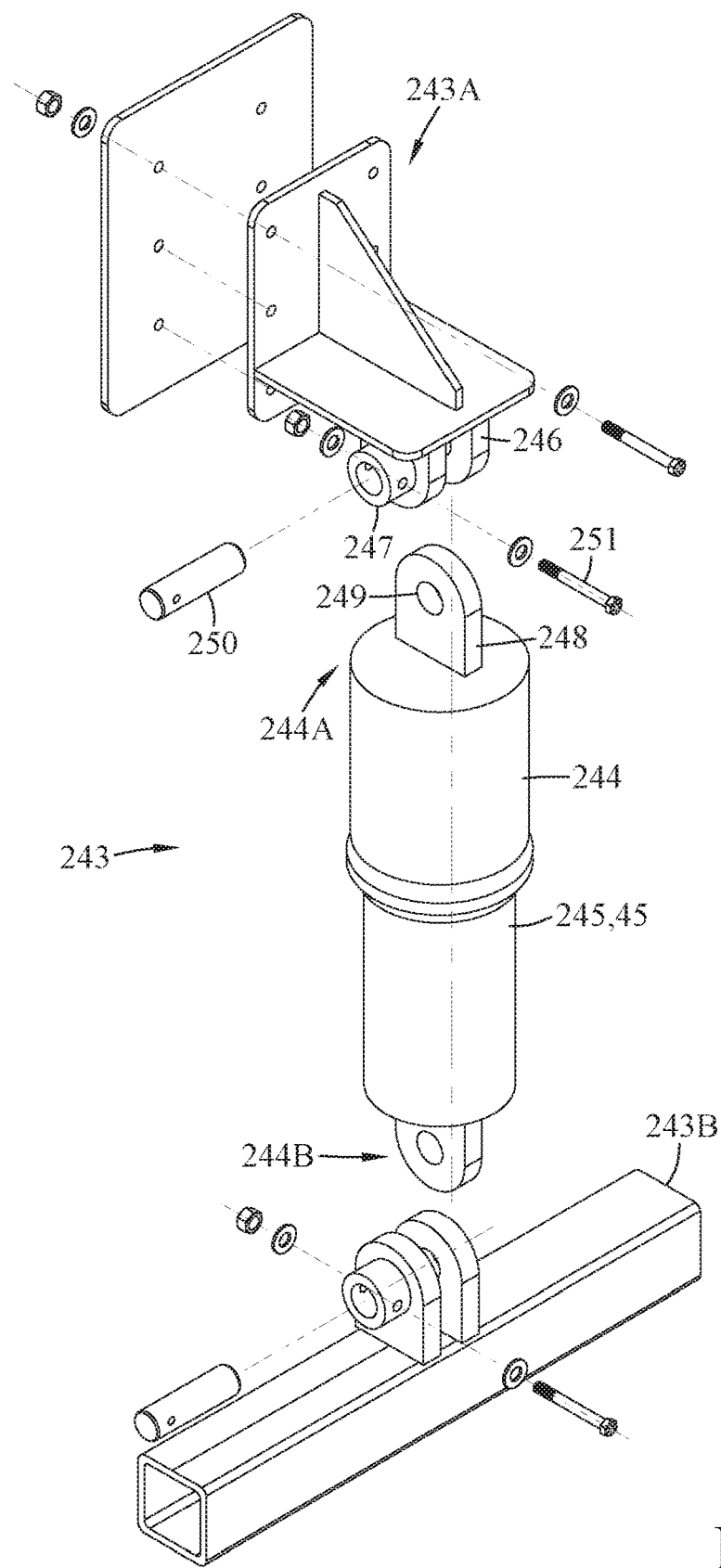
FIG. 5 is an exploded view of a displacement suspension unit of the cabin suspension system of FIG. 1.

FIG. 5 shows a possible configuration for a displacement suspension unit 243. Each displacement suspension unit 243 has a first mounting plate 243A mounted to the wall 22 of the cabin body 21, and a second mounting member 243B attached to the vehicle 10 and/or its chassis. A cabin suspension strut 244 supports the suspended load of the cabin body 21 and the operator 12 within, and is attached to the second mounting member 243B and to the first mounting plate 243A at each of its ends 244A,244B. In the depicted embodiment, the suspension strut 244 includes one attenuation member 45, which includes a linear actuator 245 to control the displacement of the cabin body 21.

In the depicted embodiment, at least the first end 244A of the suspension strut 244 is pivotably mounted. The first mounting plate 243A has a pivot bracket 246 having a collar 247 defining a through hole. The first end 244A of the suspension strut 244 has a prong 248 with a pivot hole 249 extending therethrough. The prong 248 is insertable within the pivot bracket 246 and secured thereto with a pivot pin 250. More particularly, the pivot pin 250 is inserted through the collar 247 and through the pivot hole 249 of the inserted prong 248. The pivot pin 250 is attached to the collar 247 with a mechanical fastener 251 so that the pivot pin 250 rotates with the pivot bracket 246, and thus rotates with the first mounting plate 243A. When a force causes the first mounting plate 243A to displace, it will pivot with the pivot pin 250 and cause linear displacement of the suspension strut 244. In other embodiments, the second end 244B of the suspension strut 244 is also similarly pivotably mounted to the second mounting member 243B. The displacement suspension unit 243 may therefore accommodate pivoting movement of the cabin body 21. The linear stroke of the suspension strut 244, in one embodiment, is about 5 in., meaning that it allows the cabin body 21 to travel 3 in. down and 2 in. up as it pivots in response to the loads received from the vehicle 10.

Figure 6:
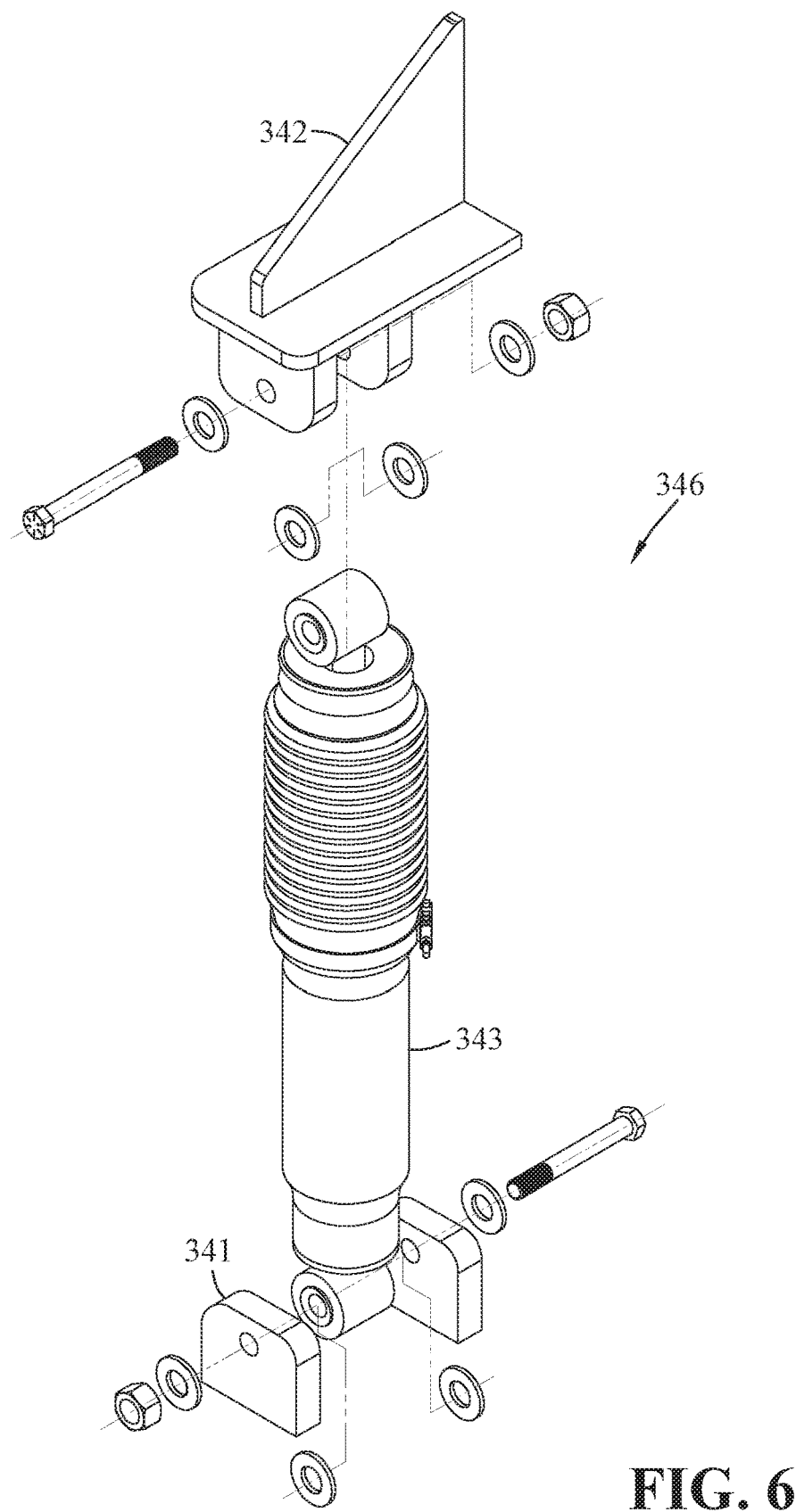
FIG. 6 is an exploded view of a shock absorbing member of the cabin suspension system of FIG. 1.

FIG. 6 shows a possible configuration for a shock absorbing member 346. Each shock absorbing member 346 has one or more ear brackets 341 mounted to the support platform 14, and a cabin bracket 342 mounted to the wall of the cabin body. A shock absorber 343 has a first end 343A mounted to the ear brackets 341 with a corresponding fastener 344, and an opposed second end 343B mounted to the cabin bracket 342.

In light of the preceding, it can be appreciated that the cabin suspension system 40 disclosed herein helps minimize the g-forces and CPM acting on the cabin 20, in compliance with certain standards such as FOPS/ROPS, while maintaining a low profile cabin 20, and thus a low profile mining vehicle 10. Indeed, the suspension system 40 disclosed herein can be used to lower the cabin's profile to desirable heights, thereby contributing to maintaining a low profile for the vehicle. The cabin suspension system 40 therefore makes it possible to fabricate a lower profile dump truck, or other mining vehicle, which is not easily done with a conventional suspension. The suspension system 40 can also be used to retrofit existing cabins by providing them with the suspension system 40.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A cabin for a mining vehicle, comprising:
    a cabin body having a plurality of interconnected walls and a floor attached to the walls, the walls and the floor defining an interior volume of the cabin body to receive within the interior volume an operator of the mining vehicle; and
    a cabin suspension system having a plurality of suspension units to support the cabin body with respect to the mining vehicle, at least two of the suspension units being pivot suspension units, each pivot suspension unit being pivotably mountable to the cabin body and being fixedly mountable to the mining vehicle, the cabin body being pivotable relative to the mining vehicle about a common pivot axis defined by the pivot suspension units, each pivot suspension unit having an attenuation member to attenuate a pivot movement of the cabin body relative to the mining vehicle.

2. The cabin as defined in claim 1, wherein each pivot suspension unit includes a first mounting plate mountable to a wall of the cabin body, and a second mounting plate mountable to the mining vehicle, the first mounting plate being pivotable relative to the second mounting plate about the common pivot axis.

3. The cabin as defined in claim 2, wherein a mounting bracket is attached to the second mounting plate and has a through slot, and a pivot pin extends through the slot and is coupled to the first mounting plate, the pivot pin being rotatable within the slot relative to the mounting bracket about the common pivot axis.

4. The cabin as defined in claim 3, wherein the attenuation member includes a polymeric bushing disposed between an outer surface of the pivot pin and an inner surface of the slot, the bushing being in frictional engagement with both the pivot pin and the slot to attenuate the pivot movement of the pivot pin relative to the slot.

5. The cabin as defined in claim 3, wherein the attenuation member includes a bumper disposed between the first mounting plate and the mounting bracket.

6. The cabin as defined in claim 1, wherein the plurality of suspension units includes a displacement suspension unit, the displacement suspension unit being mountable to a wall of the cabin body and to the mining vehicle to attenuate vertical displacement of the cabin body.

7. The cabin as defined in claim 6, wherein the displacement suspension system is pivotably mountable to the wall of the cabin body.

8. The cabin as defined in claim 1, wherein the cabin suspension system includes at least one shock absorbing member to attenuate vibrations experienced by the cabin body, a first end of the shock absorbing member being mountable to the mining vehicle and an opposed second end of the shock absorbing member being mountable to a wall of the cabin body.

9. The cabin as defined in claim 1, wherein the cabin suspension system includes a floating floor assembly disposed within the interior volume of the cabin body, the floating floor assembly having a plurality of dampening members mounted to the floor of the cabin body, and a floor plate supported by the dampening members above the floor, the dampening members being operable to attenuate vibrations transmitted to the floor plate from the floor of the cabin body.

10. An underground mining vehicle, comprising:
    a vehicle body having front wheels and rear wheels;
    a cabin mounted to the vehicle body in front of the front wheels or in back of the rear wheels, the cabin having
        a cabin body having a plurality of interconnected walls and a floor attached to the walls, the walls and the floor defining an interior volume of the cabin body to receive within the interior volume an operator of the mining vehicle; and
    a cabin suspension system having a plurality of suspension units to support the cabin body with respect to the vehicle body, at least two of the suspension units being pivot suspension units, each pivot suspension unit being pivotably mounted to the cabin body and being fixedly mounted to the vehicle body, the cabin body being pivotable relative to the vehicle body about a common pivot axis defined by the pivot suspension units, each pivot suspension unit having an attenuation member to attenuate a pivot movement of the cabin body relative to the vehicle body.

11. The underground mining vehicle as defined in claim 10, wherein the vehicle body includes a support platform disposed at a front or a rear of the vehicle body, the suspension units supporting the cabin body a vertical distance above the support platform.

12. The underground mining vehicle as defined in claim 11, wherein each pivot suspension unit includes a first mounting plate mounted to a wall of the cabin body, and a second mounting plate mounted to the support platform, a mounting bracket being attached to the second mounting plate and having a through slot, and a pivot pin extending through the slot and being coupled to the first mounting plate, the pivot pin being rotatable within the slot relative to the mounting bracket about the common pivot axis.

13. The underground mining vehicle as defined in claim 12, wherein the attenuation member includes at least one of: a polymeric bushing disposed between an outer surface of the pivot pin and an inner surface of the slot, the bushing being in frictional engagement with both the pivot pin and the slot to attenuate the pivot movement of the pivot pin relative to the slot; and a bumper disposed between the first mounting plate and the mounting bracket.

14. The underground mining vehicle as defined in claim 11, wherein the plurality of suspension units includes a displacement suspension unit mounted to a wall of the cabin body and to the vehicle body, the pivot and displacement suspension units supporting the cabin above the support platform, each pivot suspension unit being pivotably mounted to a first wall of the cabin body, and the displacement suspension unit being mounted to a second wall of the cabin body, the first wall being a different wall from the second wall of the cabin body.

15. The underground mining vehicle as defined in claim 14, wherein the cabin suspension system includes at least one shock absorbing member to attenuate vibrations experienced by the cabin body, a first end of the shock absorbing member being mounted to the support platform and an opposed second end of the shock absorbing member being mounted to a third wall of the cabin body, the third wall being a different wall from both the first and second walls of the cabin body.

16. A suspension system for a cabin of a mining vehicle, comprising: a plurality of suspension units to support the cabin with respect to the mining vehicle, at least two of the suspension units being pivot suspension units, each pivot suspension unit being pivotably mountable to the cabin and being fixedly mountable to the mining vehicle, the cabin being pivotable relative to the mining vehicle about a common pivot axis defined by the pivot suspension units, each pivot suspension unit having an attenuation member to attenuate a pivot movement of the cabin relative to the mining vehicle.

17. The suspension system as defined in claim 16, wherein each pivot suspension unit includes a first mounting plate mountable to the cabin, and a second mounting plate mountable to the mining vehicle, the first mounting plate being pivotable relative to the second mounting plate about the common pivot axis.

18. The suspension system as defined in claim 17, wherein a mounting bracket is attached to the second mounting plate and has a through slot, and a pivot pin extends through the slot and is coupled to the first mounting plate, the pivot pin being rotatable within the slot relative to the mounting bracket about the common pivot axis.

19. The suspension system as defined in claim 18, wherein the attenuation member includes a polymeric bushing disposed between an outer surface of the pivot pin and an inner surface of the slot, the bushing being in frictional engagement with both the pivot pin and the slot to attenuate the pivot movement of the pivot pin relative to the slot.

20. The suspension system as defined in claim 16, wherein the plurality of suspension units includes a displacement suspension unit, the displacement suspension unit being mountable to the cabin and to the mining vehicle to attenuate vertical displacement of the cabin.

\* \* \* \* \*